United States Patent [19]

Miura et al.

[11] 4,360,558
[45] * Nov. 23, 1982

[54] OPEN CELL FOAM RESIN SHEET HAVING A RELIEF PATTERN THEREON

[75] Inventors: Nobuo Miura, Kashiwa; Yuichi Akiba, Tokyo, both of Japan

[73] Assignee: Lonseal Corporation, Tokyo, Japan

[*] Notice: The portion of the term of this patent subsequent to Jul. 28, 1998, has been disclaimed.

[21] Appl. No.: 253,537

[22] Filed: Apr. 13, 1981

Related U.S. Application Data

[63] Continuation of Ser. No. 81,992, Oct. 4, 1979, Pat. No. 4,281,039.

[30] Foreign Application Priority Data

Oct. 6, 1978 [JP] Japan .............................. 53-123757

[51] Int. Cl.$^3$ ........................... B32B 3/12; B32B 3/26
[52] U.S. Cl. .................................... 428/159; 428/170; 428/173
[58] Field of Search ....................... 428/159, 170, 173

[56] References Cited

U.S. PATENT DOCUMENTS

| | | | |
|---|---|---|---|
| 3,070,476 | 12/1962 | Miller | 428/159 |
| 3,293,094 | 12/1966 | Nairn et al. | 428/159 |
| 3,293,108 | 12/1966 | Nairn et al. | 428/159 |
| 3,519,527 | 7/1970 | Crowley | 428/159 |
| 3,800,013 | 3/1974 | Allan | 264/52 |
| 3,857,915 | 12/1974 | Crowley | 264/52 |
| 3,941,636 | 3/1976 | Drout et al. | 264/132 |
| 4,068,030 | 1/1978 | Witman | 428/170 |
| 4,082,876 | 4/1978 | Miura | 428/159 |
| 4,090,007 | 5/1978 | Crowley | 428/170 |
| 4,187,338 | 2/1980 | Miura | 428/159 |

Primary Examiner—William J. Van Balen
Attorney, Agent, or Firm—Sandler and Greenblum

[57] ABSTRACT

A method for making a vinyl chloride resin sheet having a raised pattern thereon. The method comprises the steps of providing an open-celled vinyl chloride resin sheet and printing a portion of the sheet with a composition comprising a cross-linkable compound in accordance with the pattern to be formed. The printed sheet is then dried and subsequently heated to a temperature higher than its softening temperature whereby the open-celled unprinted portion of the sheet is depressed and whereby the printed pattern remains open-celled and stands in relief with respect to the depressed portion.

24 Claims, No Drawings

OPEN CELL FOAM RESIN SHEET HAVING A RELIEF PATTERN THEREON

This is a continuation of application Ser. No. 081,992 filed Oct. 4, 1979, U.S. Pat. No. 4,281,039.

BACKGROUND OF THE INVENTION

1. Field of the Invention

The invention relates to a method for forming a relief pattern on a vinyl chloride resin sheet and to the sheet formed by the method.

2. Description of Prior Art

A variety of processes are known for forming a vinyl chloride resin compounded composition into a formed sheet. Such techniques include a calendering process wherein a vinyl chloride resin compounded composition containing a foaming agent of a well-known type is kneaded and rolled. The resulting article is then heated at such a temperature and for a length of time such that the foaming agent is decomposed.

According to yet another process, the sheet may be formed by a mechanical foaming process wherein a vinyl chloride resin compounded composition is kneaded to give a paste sol and is then mechanically agitated while blowing air therein. The resulting foam paste is applied and then thermaly gelled.

In another process, a paste sol is obtained by kneading a foaming agent-containing vinyl chloride resin. The compounded composition is applied and thermally gelled under conditions of time and decomposition temperature of the foaming agent.

Finally, in yet another process a composition is foamed by agitating a vinyl chloride resin emulsion compounded composition while blowing air therein which is applied and then thermally gelled. The foamed sheet thus obtained may be backed with a backing material such as pulp paper, asbestos paper, a fabric, a non-woven fabric, a plywood board, an iron plate or the like, as desired.

SUMMARY OF THE INVENTION

It is an object of the invention to provide a method for applying a pattern to foamed structures.

It is a further object of the invention to provide a method for raising the patterned portion of the foamed structure in relief.

These and other objects are fulfilled by means of the method of the invention for making a vinyl chloride resin sheet having a relief pattern thereon. The method comprises the steps of providing an open-celled vinyl chloride sheet and printing a portion of the sheet with a composition comprising a cross-linkable compound in accordance with the pattern to be formed. The printed sheet is then dried and heated to a temperature higher than its softening temperature whereby the open-celled, unprinted portion of the sheet is depressed and whereby the printed pattern remains open-celled and stands in relief with respect to the depressed portion.

DESCRIPTION OF PREFERRED EMBODIMENTS

The invention relates to a method for making a vinyl chloride sheet with a printed, white-spotted pattern on the surface thereof. The method comprises printing the surface of a foamed vinyl chloride resin sheet having an open cellular structure with an ink containing a cross-linkable compound in a desired pattern such that the ink is impregnated or filled into the foamed layer of the resin sheet. The method further comprises drying the printed sheet and heating the dried sheet to a temperature higher than its softening temperature whereby areas printed with an ink containing no cross-linkable compound in a desired pattern as well as non-printed areas are both melted to disintegration and become depressed while areas printed with an ink containing the cross-linkable compound remain open-celled in structure and stand in relief.

The method of the invention further relates to a process for making a vinyl chloride printed sheet having a printed white-spotted pattern whose open cellular structure is impregnated and filled with a vinyl chloride resin paste for reinforcement. The final sheet exhibits an increased wear resistance and finds utility, for example, as a flooring material.

In one particular embodiment, the invention relates to a method comprising the step of processing a vinyl chloride resin composition into a foamed sheet having an open cellular structure which exhibits air and water vapor permeability. The method further comprises the step of printing the sheet with an ink containing a cross-linkable compound along a desired pattern while simultaneously allowing the applied ink or pigment to be impregnated into this sheet. The printed sheet is then heated to permit the open cellular structure in those areas where no cross-linkable compound is impregnated to be melted and disintegrated.

In one possible embodiment of the invention, the process further comprises the step of impregnating or filling the areas of the open cellular structure with a filling of vinyl chloride resin paste and then gelling the impregnated paste.

The sheet itself may be formed by any of the conventional techniques for forming such sheets including the following.

The vinyl chloride resin sheet having the open cellular foam structure can be made air and water vapor permeable by, for example, a technique in which air and water vapor permeabilities are imparted to the resin sheet simultaneously by heating a foaming agent in the resin at conditions of time and temperature necessary to foam a foaming agent therein.

Yet another method for imparting air and water vapor permeability to the sheet is the mechanically frothing process of vinyl chloride plastisol.

Yet another method of rendering the resin sheet air and water vapor permeable comprises mechanically perforating the sheet-like foam to impart air and water vapor permeability thereto.

The invention is of course not limited to the particular techniques used for imparting permeability and any other conventional techniques may likewise be used.

According to the invention, the desired pattern is applied by means of any or a combination of various printing techniques onto the foam sheet having good air and water vapor permeability while simultaneously impregnating the applied ink. Various techniques including flexo printing, screen printing, and gravure printing techniques may be used for this purpose.

Once the sheet has been printed with the desired pattern, the open-cellular structure is melted and disintegrated to form a printed dapple by heating the printed sheet in air to a temperature higher than the melting and softening temperature of the vinyl chloride resin.

According to one embodiment of the invention, vinyl chloride resin paste may be impregnated or packed in areas where the open-cellular structure suffers no disintegration. Such impregnation is feasible by an immersion and compression technique wherein a sheet bearing a printed, dappled pattern thereon is compressed and restored while immersing it in a vinyl chloride resin paste so as to allow the impregnation and supplementation of previously impregnated material.

In yet another technique, the paste is applied by an immersion and vaccuum suction method in which the vinyl chloride resin paste is impregnated and deposited under sucking-in-vacuo conditions while immersing the sheet, bearing the printed, dappled pattern into the paste.

The impregnated and deposited vinyl chloride resin paste may be gelled by means of ordinary heating techniques.

As referred to throughout the application, the vinyl chloride resin useful in the present invention may be one prepared by a suspension polymerization or an emulsion polymerization; the preferred degree of polymerization being about 700–2,000.

The resin of the invention may obviously comprise any plasticizers, stabilizers, foaming agents, lubricants, antioxidants, fillers, inks or pigments and surface active agents normally used in such formulations.

With respect to plasticizers for the vinyl chloride resin, such plasticizers may include phthalic esters, phosphoric esters, chlorinated fatty acid esters, chlorinated paraffin, epoxy compounds, polyesters, adipic esters, and trimellitic esters.

Though the type of stabilizer will vary depending upon the degree of polymerization of the resin used and on the amount of plasticizer, since the stabilizer influences the decomposition temperature of the foaming agent, composite stabilizers comprising cadmium, barium, zinc, lead, tin, calcium, and organic chelators may be used.

Foaming agents which may be used include dinitrosopentamethylenetetramine, azodicarbonamide, P,P'-oxybisbenzenesulfonylhydrazide, toluenesulfonylhydrazide and the like.

The lubricant used may be selected as a function of the processing conditions and its desired effect on the foaming properties of the composition. Preferably, paraffin, low molecular weight polyolefins, stearic acid, stearic esters, stearyl alcohol, waseline, amides, polyglycol esters of fatty acid and like compounds are used.

If the desired. an antioxidant may be added to the composition. Typical antioxidants which may be used include phenols, thiopropionic esters, and organic phosphite esters.

The resin may further comprise fillers including calcium carbonate, zinc oxide, magnesium oxide, aluminum hydroxide, inorganic spheres, inorganic hollow spheres, organic hollow spheres, pulp powder, wood dust, and the like.

The resin may be pigmented with an ink conventionally employed with such resins.

In addition to the above additives, a surface active agent for emulsifying the vinyl chloride resin may also be used. Such an agent may be selected from a group comprising phosphoric monoesters and diesters, polyoxyethylenesorbitanmonooleate, polyoxyethylene lauryl ether, polyethylene glycol monolaurate and the like.

In order to improve the magnifying power of foaming of the vinyl chloride resin, as well as the low-temperature characteristics and impact characteristics of the vinyl chloride resin product, any of the following materials may be added: a polyolefin polymer, a vinyl acetate-ethylene copolymer, an acrylonitrile-butadiene copolymer, an acrylic polymer, rosin ester and the like.

The printing ink or pigment used in the invention may be an aqueous or nonaqueous organic ink and is applied to the foamed sheet in an image-wise pattern such that the ink impregnates or fills the sheet from its surface into the foamed layer.

The vinyl chloride resin paste referred to above for use in reinforcing the remaining open-celled areas by impregnation, may be prepared by any conventional technique and is preferably of low viscosity.

In the course of making the foamed sheet having an open cellular structure which is air and water vapor permeable, the addition to the vinyl chloride resin composition of a metal oxide capable of accelerating the cross-linking velocity of the vinyl chloride resin may be desirable. Thus, the addition of zinc oxide, lead oxide, magnesium oxide, antimony oxide, zirconium oxide, barium oxide, iron oxide, or tin oxide, contributes to substantially improve the rate and degree of cross-linkage of the vinyl chloride resin by the cross-linkable ink.

The printed sheet having the open cellular structure described above may be provided with a transparent protecting layer over its surface so as to protect the printed surface and to increase its durability. In this instance, the transparent layer is preferably formed from a hardening resin such as a two-component polyurethene or a one-component polyurethene, or from a mixture of the polyurthene with vinyl chloride resin.

Cross-linking compounds for cross-linking the vinyl chloride resin of the present invention include 2-mercaptoimidazoline, diethylthiourea, trimethylthiourea, tetramethylthiourea, N,N'-diphenylphenylenediamine, diphenylguanidine, isocyanate, trithiocyanuric acid and its derivatives, and mercaptotriazine and its derivatives or their metal salts. These compounds may be used singly or in combination.

The cross-linkable compound which may be incorporated into the open-celled patterned portion of the sheet include those compounds capable of vulcanization, those capable of cross-linking and hardening with an amine, those capable of cross-linking and hardening by virture of an inorganic compound such as ammonium chloride, and those capable of cross-linking and hardening by photopolymerization, as well as mixtures thereof.

Examples of compounds which may be cross-linked by vulcanization include rubbers such as acrylonitrile-styrene-butadiene rubber, chlorosulfonated polyethylene rubber, chloroprene rubber and the like, which may in some cases also be cross-linked by a peroxide.

Materials or compounds capable of polymerizing, cross-linking, and hardening by virture of peroxide include monomers, low molecular weight polymers and prepolymers such as acryl methacrylate, diallyl fumarate, triethylene glycol dimethacrylate, ethylene glycol dimethacryllate, tetraethylene glycol dimethacrylate, 1,3-butylene glycol dimethacrylate, polyethylene glycol dimethacrylate, trimethylolpropane trimethacrylate, diallyl phthalate, polyesters having at least two inner olefinic unsaturations, and mixtures thereof.

Compounds which may be cross-linked and hardened by photopolymerization which may be used within the context of the invention include but are not limited to, a combination of prepolymers of hexamethylenediamine adipate and ε-caprolactam, N,N'-hexamethylene-bis-methacrylamide serving as a cross-linking agent and a cross-linking initiator such as benzophenone, a combination of a copolymer of triethylene glycol dimethacrylate, and methylacrylate-P-vinylbenzoic acid and benzoyl ethyl ether, and the like.

According to one exemplary embodiment of the invention, the vinyl chloride resin composition is admixed with an acrylonitriale-butadiene-styrene copolymer, sulfur oxide and zinc oxide to form a foamed sheet having good air and water vapor permeabilities. The sheet is then printed in an image-wise pattern with a printing ink containing a vulcanization accelerator such as tetramethylthiourea disulfide, zinc dimethyldithiocarbamate, or the like simultaneously impregnating the sheet with the ink.

In another embodiment of the invention, when using a combination of a compound which is polymerized, vulcanized, and cured with a peroxide, may comprise a combination of diallyl phthalate and a peroxide such as benzoyl peroxide or tertiary butyl perbenzoate contained in the ink.

In another embodiment, an amine hardener comprising a combination of an epoxy resin such a epoxidized soybean oil and benzyldimethylamine is used. In this instance the epoxy resin is contained in the foamed sheet while the benzyldimethylamine is contained in the ink.

In yet other embodiments, urea or melamine are examples of compounds which may be hardened with ammonium chloride or ammonium secondary phosphate. In this embodiment, both components are contained in the ink.

According to yet another embodiment of the invention, compounds showing very strong intermolecular bonds with the vinyl chloride resin thereby increasing viscosity of the resin upon application of heat are thixotropic agents including aluminum stearate, monobenzyl sorbitol, dibenzyl sorbitol, tribenzyl sorbitol, organic complexes such as hydrous aluminum silicate, and the like, and mixtures thereof.

Quite obviously, the air and water vapor permeability of the vinyl chloride resin sheet may be increased if desired, by slicing the sheet into slices having an appropriate thickness.

The invention will now be described with reference to the following examples.

EXAMPLE 1

A composition having the following formulation is prepared and applied to form a layer having a thickness of about 0.7 mm. All quantities are listed in parts by weight.

| | |
|---|---|
| Vinyl Chloride Resin (GENON 121) | 100 |
| Plasticizer (DOP) | 60 |
| TCP | 20 |
| Cadminum-barium stabilizer | 5 |
| Foaming agent (VINYFOR AW9) [Eiwa Chem. Synthetic Co., Ltd] | 5 |
| Vaseline | 10 |
| Silasballoon (The microballoon of volcanic rock) | 30 |
| Calcium carbonate | 10 |
| Titanium oxide | 10 |

The coated paper is heated in an air temperature of 190-200 degrees centigrade for three minutes to simultaneously foam and gel the layer thereby resulting in a foam having good air and water vapor permeabilities. The resulting sheet is then printed with an ink having the following formulation by a gravure printing technique such that the applied ink is permitted to impregnate the sheet.

| | |
|---|---|
| Aqueous color ink | 10 |
| 2-mercaptoimidazoline | 5 |
| Tetramethylthiourea | 5 |

The sheet having the printed pattern impregnated with ink is heated at a temperature of 180 degrees centigrade for five minutes. As a result, a vinyl chloride resin sheet is obtained having a printed, dappled pattern in which the printed pattern areas are held open in a cellular structure and are in raised relief while the open cellular structure in the nonprinted areas becomes meltingly disintegrated thus becoming depressed.

EXAMPLE 2

The following mixture is prepared and applied to a non-woven glass fabric in the form of a layer having a thickness of about 0.7 mm. All quantities are in parts by weight.

| | |
|---|---|
| Vinyl chloride resin (GEON 121) | 100 |
| Plasticizer (DOP) | 50 |
| Stabilizer (STABILIZER F[Kyodo Chem. Co. Ltd.]) | 5 |
| Foaming agent (UNIFOAM AZ-F[Otsuka Chem. Co., Ltd]) | 10 |

The coated sheet is heated in an air temperature of about 190 to about 200 degrees centigrade for three minutes to simultaneously foam and gel the layer thereby resulting in a foam having an open cellular structure exhibiting good air and water vapor permeabilities. The sheet is then subjected to a gravure printing technique using an ink having the following composition while permitting the ink to impregnate the layer.

| | |
|---|---|
| Copolymer by suspension polymerization (GEON 400 × 150ML) | 100 |
| Plasticizer (DOP) | 50 |
| Stabilizer (ADVASTAB BZ16NT Katsuta Chem. Co., Ltd.) | 4 |
| Azo red pigment | Suitable amount |
| ANON (Cyclohexanone) | 100 |
| MEK (Methylethylketone) | 500 |
| Dibenzasorbitol (GELOL D [Shin Nippon Phy. and Chem. Co., Ltd]) | 10 |

The foam having the printed pattern thereon and impregnated with the ink is heated at a temperature of about 190 degrees centigrade for five minutes. As a result, a foamed sheet is obtained having a printed, dappled pattern in which the non-printed areas become depressed as a result of the disintegration of the open cellular structure whereas the printed pattern areas are colored from the front surface to the back and are in raised relief.

The resulting sheet is then immersed in a vinyl chloride resin paste having the following composition.

| | |
|---|---|
| Vinyl chloride resin (GEON 25) | 100 |
| Plasticizer (DOP) | 50 |
| Stabilizer (ADVASTAB BZ16NT [Katsuta Chem. Co., Ltd.]) | 5 |
| Mineral Spirit | 20 |

The treated sheet is then repeatedly passed between a metal and rubber roller under pressure.

The paste remaining on the surface of the sheet is wiped off and the sheet is then allowed to stand in air at a temperature of about 160 degrees centigrade for a period of five minutes so as to obtain a solid-state printed, dappled pattern bearing sheet in which the paste is impregnated and filled in the areas of the foam where the open cellular structure remains.

EXAMPLE 3

A composition having the following formulation is prepared and applied to a woven fabric in a layer thickness of about 0.5 mm. All quantities are listed in parts by weight.

| | |
|---|---|
| Vinyl chloride resin (GEON 121) | 100 |
| Plasticizer (DOP) | 70 |
| Stabilizer (ADVASTAB ABC1T [Katsuta Chem. Co., Ltd.]) | 5 |
| Foaming agent (VINYLFOR AW9 [Eiwa Chem. Synthetic Co., Ltd.]) | 5 |
| Vaseline | 15 |
| Liquid rubber (NIPOL 1312 [Nippon Zeon Co., Ltd.]) | 20 |
| Sulfur | 0.5 |
| Calcium carbonate | 10 |

The thus coated sheet is heated in an air temperature of about 190 to about 200 degrees centigrade for three minutes to simultaneously foam and gel the layer so as to obtain a foam having an open cellular structure exhibiting good air and water permeabilities. The foam is sliced into a sheet having a thickness of about 1 mm. The sliced sheet is then subjected to a monochronomatic gravure printing using an ink having the following formulation.

| | |
|---|---|
| AQUA PS (red) (Product of Toyo Ink Co., Ltd.) | 50 |
| Zinc dimethyldithiocarbamate | 10 |

An ink having the following formulation, using another color, is then printed in the course of a second gravure printing.

| | |
|---|---|
| AQUA PS (white) (Product of Toyo Ink Co., Ltd.) | whole quantity |

The foam impregnated and printed with the red and white inks is heated at a temperature of about 190 degrees centigrade for about 5 minutes to obtain a suede-like foam having a printed dapple in raised relief and in which the white non-printed areas become depressed as a result of the disintegration of the open cellular structure while the red areas maintain their open cellular structure.

Although the invention has been described with respect to particular resins, stabilizers, foaming agents, plasticizers, dies and pigments, and colors, it is to be understood that the invention is not limited to the particulars disclosed and that substitution of equivalents is possible without departing from the scope of the claims.

What is claimed is:

1. A vinyl chloride resin sheet having a relief pattern thereon, said sheet comprising raised and depressed portions, said raised portions comprising an open cell foam filled with a hardening material, and said depressed portions comprising a depressed open cell foam.

2. The resin sheet as defined by claim 1 wherein said hardening material prevents the depression of said open cell foam when said open cell foam is heated.

3. The resin sheet as defined by claim 1 wherein said hardening material is a hardened ink.

4. The resin sheet as defined by claim 1 wherein said hardening material is a cross-linked resin formed from a paste.

5. The resin sheet as defined by claim 4 wherein said paste is vinyl chloride resin paste.

6. The resin sheet as defined by claim 1 further comprising a backing material.

7. The resin sheet as defined by claim 1 further comprising a transparent layer applied over said raised and depressed portions.

8. The resin sheet as defined by claim 1 wherein said hardening material is a cross-linked compound formed from a member selected from the group consisting of: a compound capable of cross-linking said vinyl chloride resin; a compound which itself may be cross-linked and cured; a compound capable of cross-linking a substance present in said vinyl resin sheet; a compound exhibiting a highly pronounced intermolecular bond with said vinyl chloride resin and which is capable of substantially raising the viscosity of said vinyl chloride resin when heated; or mixtures thereof.

9. The resin sheet as defined by claim 8 wherein said cross-linked compound is formed from a compound capable of cross-linking a substance present in said vinyl resin sheet.

10. The resin sheet as defined by claim 9 wherein said cross-linked compound is formed from a cross-linkable compound which is a member of the group consisting of: 2-mercaptoimidazoline, diethylthiourea; trimethylthiourea; tetramethylthiourea; N,N'-diphenylphenylenediamine; diphenylguanidine; isocyanate; trithiocyanuric acid and its derivatives; mercaptotriazine and its derivatives; metal salts of mercaptotriazine; and mixtures thereof.

11. The resin sheet as defined by claim 8 wherein said hardening material is formed from a cross-linkable compound which itself is cross-linked and cured.

12. The resin sheet as defined by claim 11 wherein said cross-linkable compound is a member of the group consisting of: a compound capable of cross-linking by vulcanization; a compound capable of being cross-linked by a peroxide; a compound which is cross-linkable and hardenable with an amine; a compound capable of being cross-linked and hardened with an inorganic compound; a compound capable of being cross-linked and hardened by photopolymerization; and mixtures thereof.

13. The resin sheet method as defined by claim 12 wherein said cross-linkable compound is cross-linked by vulcanization.

14. The resin sheet as defined by claim 12 wherein said cross-linkable compound is a rubber selected from the group consisting of: acrylonitrile-butadiene-styrene rubber; chlorosulfonated polyethylene rubber; chloroprene rubber; and mixtures thereof.

15. The resin sheet as defined by claim 11 wherein said cross-linkable compound is a compound capable of being cross-linked by a peroxide.

16. The resin sheet as defined by claim 15 wherein said cross-linkable compound is a monomer, low molecular weight polymer and prepolymer selected from the group consisting of: acryl methacrylate; diallyl fumarate; triethylene glycol dimethacrylate; ethylene glycol dimethacrylate; tetraethylene glycol dimethacrylate; 1,3-butylene glycol dimethacrylate; polyethylene glycol dimethacrylate; trimethololpropane trimethacrylate; diallyl phthalate; polyesters having at least two inner olefinic unsaturations; and mixtures thereof.

17. The resin sheet as defined by claim 11 wherein said cross-linkable compound is cross-linked and hardened with an amine.

18. The resin sheet as defined by claim 17 wherein said amine is benzyldimethylamine.

19. The resin sheet as defined by claim 11 wherein said cross-linkable compound is cross-linked and hardened with an inorganic compound.

20. The resin sheet as defined by claim 19 wherein said inorganic compound is ammonium chloride or ammonium secondary phosphate and said cross-linkable compound is urea or melamine or a mixture or derivative thereof.

21. The resin sheet as defined by claim 11 wherein said cross-linkable compound is cross-linked and hardened by photopolymerization.

22. The resin sheet as defined by claim 21 wherein said cross-linkable compound is selected from the group consisting of: hexamethylenediamine adipate and ε-caprolactam.

23. The resin sheet as defined by claim 11 wherein said cross-linkable compound is a compound exhibiting a highly pronounced intermolecular bond with said vinyl chloride resin and which is capable of substantially raising the viscosity of said vinyl chloride resin when heated.

24. The resin sheet as defined by claim 23 wherein said cross-linkable compound is selected from the group consisting of: aluminum stearate; monobenzyl sorbitol; dibenzyl sorbitol; tribenzyl sorbitol; hydrous aluminum silicate; and mixtures thereof.

* * * * *

UNITED STATES PATENT AND TRADEMARK OFFICE
CERTIFICATE OF CORRECTION

PATENT NO. : 4,360,558

DATED : November 23, 1982

INVENTOR(S) : Nobuo MIURA and Yuichi AKIBA

It is certified that error appears in the above-identified patent and that said Letters Patent is hereby corrected as shown below:

Column 3, line 9, Change "vaccuum" to --vacuum--.

Column 5, line 26, insert --, or mixtures or derivatives thereof,-- after "melamine".

Column 5, line 58, change "Vaseline" to --Waseline--.

Column 7, line 23, change "Vaseline" to --Waseline--.

Signed and Sealed this

Nineteenth Day of April 1983

[SEAL]

Attest:

GERALD J. MOSSINGHOFF

Attesting Officer     Commissioner of Patents and Trademarks